United States Patent [19]

Suzuki et al.

[11] Patent Number: 4,725,892

[45] Date of Patent: Feb. 16, 1988

[54] METHOD AND APPARATUS FOR ENLARGING OR REDUCING AN IMAGE ON THE BASIS OF PRECALCULATED REFERENCE PEL CONTRIBUTION RATE DATA AND TWO-DIMENSIONAL REFERENCE WINDOW SHIFTING AMOUNT DATA STORED IN A TABLE MEMORY

[75] Inventors: Naoshi Suzuki, Fujisawa; Hiroshi Yanagisawa; Taketoshi Yokemura, both of Yokohama, all of Japan

[73] Assignee: International Business Machines Corporation, Armonk, N.Y.

[21] Appl. No.: 855,559

[22] Filed: Apr. 25, 1986

[30] Foreign Application Priority Data

Jun. 27, 1985 [JP] Japan ................. 60-139267

[51] Int. Cl.$^4$ ............... H04N 1/393; H04N 1/387; G06G 7/30; G06K 9/42
[52] U.S. Cl. .................. 358/287; 358/280; 340/728; 340/731; 364/577; 382/47
[58] Field of Search .......... 358/77, 287, 280; 382/47; 364/577; 340/728, 731

[56] References Cited

U.S. PATENT DOCUMENTS

| 4,381,547 | 4/1983 | Ejiri | 382/47 |
|---|---|---|---|
| 4,528,693 | 7/1985 | Pearson et al. | 358/287 |
| 4,532,602 | 7/1985 | DuVall | 382/47 |
| 4,578,812 | 3/1986 | Yui | 382/47 |
| 4,587,621 | 5/1986 | DuVall | 358/287 |
| 4,610,026 | 9/1986 | Tabata et al. | 382/47 |

FOREIGN PATENT DOCUMENTS

| 210767 | 12/1982 | Japan | 358/77 |
|---|---|---|---|
| 84358 | 5/1983 | Japan . | |
| 200369 | 11/1984 | Japan | 382/47 |
| 20680 | 2/1985 | Japan | 358/287 |

OTHER PUBLICATIONS

Kak et al., *Digital Picture Processing*, vol. 1, Academic Press, 1982, pp. 6-7, 12-13.
Liao, Henry; "Table Look-Up Realization of Digital Filtering", Xerox Disclosure Journal, vol. 5, No. 1, Jan./Feb. 1980, pp. 115-116.

*Primary Examiner*—James J. Groody
*Assistant Examiner*—Randall S. Svihla
*Attorney, Agent, or Firm*—Douglas W. Cameron

[57] ABSTRACT

A method and apparatus for reducing or enlarging an image. More specifically, this invention can increase or decrease the magnification ratio of an image even while scanning each line. This invention involves converting a first image with a first pel density to a second image with a second pel density. The intensity P of a new pel at a point p of the second image is represented by $$P = \sum_{i=1}^{m} ai \cdot Ii$$

where m is the number of reference pels of the first image that are sampled and that are within a given two-dimensional reference window when it is in a predetermined position corresponding to the point p, where Ii is the intensity of the i-th pel of the m sampled reference pels, and where ai is a contribution rate indicating how much the i-th pel contributes to the intensity P. Pre-calculated contribution rate data (ai) and pre-calculated shifting amount data indicating the relative amount the reference window is to be shifted are stored in a memory. The shifting amount data is used to position the reference window to a predetermined position where the m reference pels are sampled, and the contribution rate data and the values of the m sampled pels are used to determine the intensity P.

8 Claims, 5 Drawing Figures

EMBODIMENT

EMBODIMENT

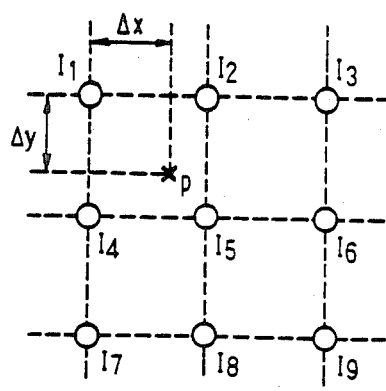
RELATIONS OF LOCATIONS
OF PELS TO BE SET FOR
THE SCALING
FIG. 2
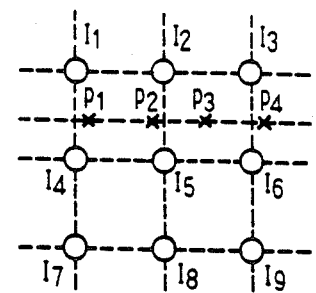
ENLARGING
FIG. 3
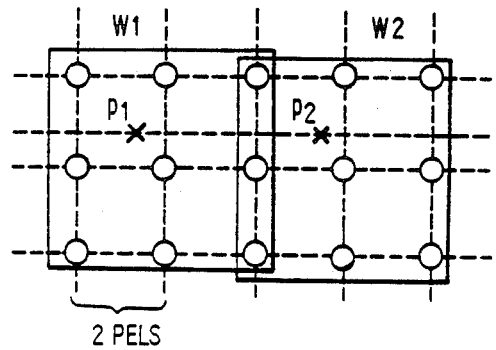
REDUCING
FIG. 4
| ESTIMATED PEL | $P_1$ | $P_2$ | $P_3$ | $P_4$ | $P_5$ | | $P_i$ | |
|---|---|---|---|---|---|---|---|---|
| COEFFICIENT INFORMATION | $a_{11}$ $a_{12}$ ⋮ $a_{19}$ | $a_{21}$ $a_{22}$ ⋮ $a_{29}$ | | | | | $a_{i1}$ $a_{i2}$ ⋮ $a_{i9}$ | ...... |
| REFERENCE PEL LOCATION INFORMATION (RELATIVE VALUE) | 0 | 0 | +1 | +1 | | | +2 | |
FORMAT OF INFORMATION BEING STORED
IN TABLE MEMORY
FIG. 5

METHOD AND APPARATUS FOR ENLARGING OR REDUCING AN IMAGE ON THE BASIS OF PRECALCULATED REFERENCE PEL CONTRIBUTION RATE DATA AND TWO-DIMENSIONAL REFERENCE WINDOW SHIFTING AMOUNT DATA STORED IN A TABLE MEMORY

DESCRIPTION

Technical Field

This invention relates to an apparatus for changing the magnification ratio of an image (enlargement or reduction of size), or for changing the resolution thereof. More particularly, this invention relates to an image conversion apparatus that can increase (enlarge) or decrease (reduce) the magnification ratio (size) of an image even while scanning each line by allowing the setting of discretionary increases or decreases of pel density.

Description of the Prior Art

Although Japanese Kokai 58-84358 discloses an image enlarging apparatus, which stores only a significance coefficient S in a table memory, so that it is impossible to variably control addressing for reading data from an input image memory by affecting input address calculations in relation to the significant coefficient of each storage location.

As the office automation develops, demand is increased more and more to edit not only characters but also images. However, it becomes a problem in that, since size and resolution of characters and images are not unified for current image input/output apparatuses, local changes or unification cannot be easily attained. This invention grasps such problem as the problem to be solved.

SUMMARY OF THE INVENTION

It is arranged to store coefficient information in combination with reference pel location information in a table memory by taking notice that it is required to variably control sequential shifting of the location of a reference pel region (reference window) in response to estimated pel location information when the magnification ratio is discretionally changed.

BRIEF DESCRIPTION OF THE DRAWINGS

FIG. 2 is a conceptual diagram indicating relations of locations of pels to be set for the scaling.

FIG. 3 is a conceptual diagram for enlargement.

FIG. 4 is an example of reduction shown together with reference window regions W1 and W2.

FIG. 5 is a diagram showing the format of information stored in a table memory.

DESCRIPTION OF THE PREFERRED EMBODIMENT

Figure 1:
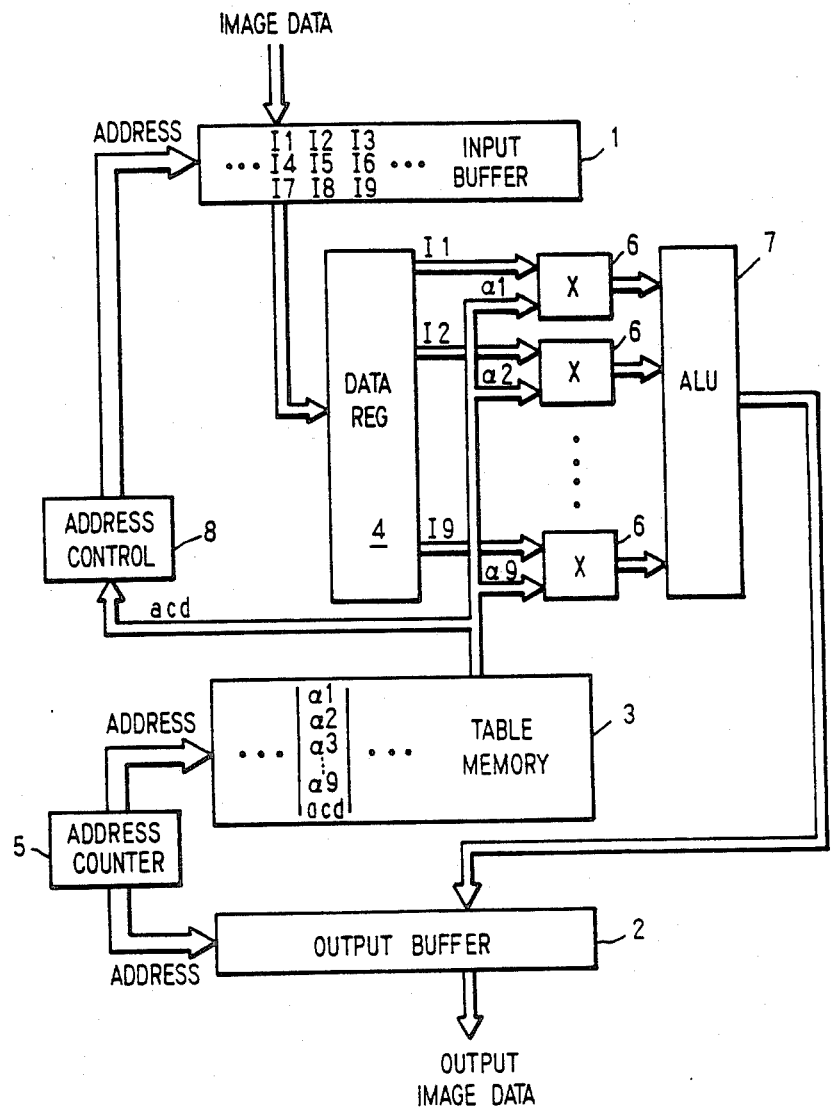
FIG. 1 is a schematic diagram of an apparatus of the preferred embodiment of the invention.

FIG. 1 shows a schematic diagram of the apparatus of the preferred embodiment. An input buffer 1 is used to store pel information of an original image to be changed with its magnification ratio. I1-I9 represent, respectively, the intensity of each stored reference pel of a pel region. An output buffer 2 is used to store data on pels processed for the magnification change, and to output this data to the following display unit and printer.

The image magnification ratio conversion of the invention follows a technique of, so to speak, extended convolution that extends the concept of convolution.

Although, generally, with convolution, the number of reference pels and the locations of these pels can be discretionally set, a description is made for a case where pels of 3×3 are processed as one reference pel region (hereinafter called "reference window").

As shown in FIG. 2, it is assumed that intensity of each pel is I1-I9, and that location of a pel to be set for the magnification ratio change is a point p. Because estimated (interpolated) intensity P at the point p is much affected by effect of nearby reference pels, and little affected by effect of remote reference pels, it can be expressed as the following equation by using a function of $\Delta x$ and $\Delta y$:

$$P = I1 \cdot f1 (\Delta x, \Delta y) + \ldots + I9 \cdot f9 (\Delta x, \Delta y) \quad (1)$$

$$= \sum_{i=1}^{9} Ii \cdot fi (\Delta x, \Delta y)$$

where $\sum_{i=1}^{9} fi (\Delta x, \Delta y) = 1$

In equation (1), fi ($\Delta x$, $\Delta y$) can be considered to be a rate indicating how much the intensity Ii of each reference pel contributes to the intensity P of point p, or contribution rate (where $i = 1-9$). If this contribution rate is assumed to be $\alpha i$, where $\alpha i = fi (\Delta x, \Delta y)$, equation (1) can be written as follows:

$$P = \sum_{i=1}^{9} \alpha i \cdot Ii \quad (2)$$

In the usual operation for a simple space convolution, the location of a 3×3 reference window shifts by one pel location as one pel is outputted. However, in performing scaling with the magnification ratio, it does not always shift by one pel location for one process.

Because enlargement means, for example, converting 300 pels/inch to 400 pels/inch, the locations of estimated pels p1 and p2 become closer as shown in FIG. 3. In calculating intensity P1 and intensity P2 at p1 and p2, respectively, one notices that the rate of contribution of a reference pel to P1 and the rate of contribution of the same reference pel to P2 are different. Thus, the values of intensity P1 and P2 can be expressed as follows:

$$P1 = \sum_{i=1}^{9} \alpha i \cdot Ii$$

$$P2 = \sum_{i=1}^{9} \beta i \cdot Ii$$

Because, in general, spacing between estimated pels becomes smaller as the enlargement ratio becomes higher, the frequency for calculation of estimated value by the same reference window becomes higher (that is, without shifting the reference window).

On the other hand, with reduction, the spacing of estimated pels becomes coarser as the reduction ratio becomes higher. If it is assumed that the reference pel (window) region is at W1 and then at W2 as shown in FIG. 4, the displacement between W1 and W2 is two pels. Namely, in this example of reduction, it is sufficient to perform processing by shifting the reference window by two pels. In general, the reference window is displaced by n pels in the reduction. In addition, this displacement is not constant in the processing of one scanning line for either enlargement and reduction, but varies constantly depending on location of an estimated pel. Therefore, it is required to control variably the displacement as the processing progresses.

As seen from the above, it is required to add the following two control factors to change the magnification ratio by extending the conventional convolution operation:

(1) control for providing different coefficient (contribution rate for estimated pel for each reference pel) for each estimated pel pi, and
(2) control for discretionally varying the reference pel location according to the enlargement or reduction ratio.

To attain the above controls, because it takes time to conduct calculation for each estimated pel, the following are calculated in advance and stored in a table memory:

(1) a table (numeric table) for providing different coefficients for each estimated pel, and
(2) a table for providing information representing the reference pel location information for each estimated pel.

They may be stored in a separate, large capacity storage and selectively transferred to the table memory as required.

Such tables have a format shown in FIG. 5. The reference pel location information (relative value), as shown in the bottom line of this figure, is a value indicating how many pels the reference window should be shifted from the previous reference windows for calculating the next estimated pel. For example, in the example of enlargement in FIG. 3, because the locations of p1 and p2 belong to a same reference window and their intensity P1 and P2 can be calculated by using the same reference pels of I1–I9, the shifting is 0, while the reference window is shifted by one reference pel for the p3 location. That is, it indicates that a +1 increment is required.

In the example of reduction in FIG. 4, it is shown that shifting by two pels or +2 is required for p2.

The relative location control information for reference pels in the table as shown in FIG. 5 enables one to obtain an estimated value by indicating a relative location for the reference window region to be used every time and by using the coefficient information. It becomes possible to vary the table to meet interpolation in any algorithm and any magnification ratio by arranging the coefficient information $\alpha ij$ and the relative pel location information (address value) to be rewritten. It may even be possible to perform only enlargement in a fixed ratio as in the above mentioned prior art (Japanese Kokai No. 58-84358). In such case, it is always sufficient to make the value of the reference pel relative location information +1.

FIG. 1 shows a circuit configuration of the image conversion apparatus according to the above mentioned concept.

A table memory 3 in FIG. 1 has a set of coefficients $\alpha 1 - \alpha 9$ being used for the convolution operation, and address control data (acd) representing relative addresses of reference pels for each reference window. The term "acd" is also referred to as the "location (address) of the reference pel" or the "reference pel location information (relative value)". See FIG. 5. For producing a new pel output, values of I1–I9 of $3 \times 3$ reference pels stored in a data register 4 and values of coefficients $\alpha 1 - \alpha 9$ in the table memory 3 stored at an address currently indicated by an address counter 5 are simultaneously sent to multipliers 6 and an arithmetic and logic unit (ALU) 7 for execution of convolution. The result is stored in an address of the output buffer 2 indicated by the address counter 5. Then, the addresses of the table memory 3 and the output buffer 2 are incremented by +1 to indicate storage locations for a coefficient set and an output pel for the next convolution.

On the other hand, an address controller 8 decodes the value of the acd read to indicate the location of the reference window for the next convolution and to store the new required intensity values of input buffer 1 into data register 4. For example, in a case of enlargement, the location of reference window may not be changed and the same I1–I9 are used again. In a case of reduction, the address indicated by the address controller 8 may be changed by two or more. Furthermore, in a case of a process such as filtering on which one-to-one conversion is premised, it is incremented only by +1 for output of each pel similar to the value of address counter 5.

Since the pel density can be discretionally increased or decreased, an image can be enlarged or reduced at any magnification ratio. In the case where the magnification ratio of the image is reduced, if data prior and after the conversion is inputted to a same display, the data after conversion is displayed as an image with reduced size because its pel density is lowered. If they are displayed in same size, the data after the conversion provides a coarse image with reduced resolution. For the enlargement, the results are opposite to the above.

Having thus described our invention, what we claim as new, and desired by Letters Patent is:

1. An image conversion apparatus, in which, when a first image with a first pel density is converted to a second image with a second pel density, the intensity P of a new pel (estimated pel) at a point p of said second image is represented by $$P = \sum_{i=1}^{m} \alpha i \cdot Ii$$

when m is a number of reference pels of said first image that are sampled and that are within a two-dimensional reference window when said window is in a predetermined position corresponding to the point p, where Ii is the intensity of i-th pel of said m sampled reference pels, where m is $\geq 3$, and where $\alpha i$ is a contribution rate indicating how much the i-th pel contributes to the intensity P, said image conversion apparatus comprising:

first storage means for storing said first image;
address controlling means for shifting said reference window to sample m reference pels of said first image at each of a plurality of predetermined positions;
second storage means for storing previously-calculated shifting amount data indicating how much said reference window is to be shifted and for storing previously-calculated contribution rate data for each of said m sampled reference pels in the form of a data table by interrelating the shifting amount data and the contribution rate data;

calculating means for calculating the intensity P of said new pel; and addressing means for accessing said second storage means so as to supply therefrom said shifting amount data and said contribution rate data to said address controlling means and to said calculating means, respectively.

2. An image conversion apparatus as recited in claim 1, wherein a magnification ratio of said second image relative to said first image may be selectively varied by selecting said shifting amount data stored in said second storage means in accordance with a desired magnification ratio representing either an enlargement or a reduction of said first image.

3. An image conversion apparatus as recited in claim 1 wherein said second storage means comprises a table memory for storing said shifting amount data and said contribution rate data.

4. An image conversion apparatus as recited in claim 1, wherein said addressing means comprises an address counter for accessing said second storage means so as to supply therefrom said shifting amount data to an address controller in said address controlling means, and so as to supply therefrom said contribution rate data to a plurality of multipliers in said calculating means.

5. An image conversion apparatus, in which, when a first image with a first pel density is converted to a second image with a second pel density, the intensity P of a new pel (estimated pel) at a point p of said second image represented by $$P = \sum_{i=1}^{m} ai \cdot Ii$$

where m is a number of reference pels of said first image that are sampled and that are within a two-dimensional reference window when said window is in a predetermined position corresponding to the point p, where Ii is the intensity of the i-th pel of said m sampled reference pels, where m is $\geq 3$, and where $ai$ is a contribution rate indicating how much the i-th pel contributes to the intensity P, said image conversion apparatus comprising:

an input buffer for storing said first image;

address controlling means for shifting said reference window to simultaneously sample m reference pels of said first image at each of a plurality of predetermined positions;

a table memory for storing previously-calculated shifting amount data indicating how much said reference window is to be shifted and for storing previously-calculated contribution rate data for each of said m sampled reference pels in the form of a data table interrelating the shifting amount data, the contribution rate data, and the identity of corresponding new pels of said second image;

calculating means for calculating the intensity P of said new pel, said calculating means comprising a plurality of multipliers and an arithmetic logic unit; and an address counter for accessing said table memory so as to supply therefrom said shifting amount data to said address controlling means, whereby shifting of said reference window is variably controlled in accordance with said shifting amount data, and so as to supply therefrom said contribution rate data to said calculating means.

6. A method of converting an image, wherein a first image with a first pel density is converted to a second image with a second pel density, the intensity P of a new pel (estimated pel) at a point p of said second image being represented by the expression $$P = \sum_{i=1}^{m} ai \cdot Ii$$

where m is a number of reference pels of said first image that are sampled and that are within a two-dimensional reference window when said window is in a predetermined position corresponding to the point P, where Ii is the inensity of the i-th pel of said m sampled reference pels, where $m \geq 3$, and where $ai$ is a contribution rate indicating how much the i-th pel contributes to the intensity P, the method comprising the steps of:

storing said first image in a first storage means;

storing previously-calculated shifting amount data indicating how much said reference window is to be shifted in a second storage means;

storing previously-calculated contribution rate data for each of said m sampled reference pels in said second storage means such that said shifting amount data and said contribution rate data are interrelated in the form of a data table;

shifting said reference window in accordance with said shifting amount data;

sampling said m reference pels of said first image; and calculating the intensity P of said new pel using said contribution rate data and the values of said m sampled reference pels in accordance with the expression for the intensity P.

7. A method as recited in claim 6, wherein a magnification ratio of said second image relative to said first image may be selectively varied by selecting said shifting amount data stored in said second storage means in accordance with a desired magnification ratio.

8. A method as recited in claim 6, wherein said second storage means is a table memory.

* * * * *